(12) United States Patent
Makin et al.

(10) Patent No.: US 11,097,755 B2
(45) Date of Patent: Aug. 24, 2021

(54) MEASURING ASSEMBLY, DETECTION DEVICE AND METHOD OF USING SAME

(71) Applicant: Arc Infrastructure Pty Ltd, Perth Airport (AU)

(72) Inventors: Bruce Arthur Makin, Welshpool (AU); Parviz Barati, Welshpool (AU)

(73) Assignee: Arc Infrastructure Pty Ltd, Perth Airport (AU)

( * ) Notice: Subject to any disclaimer, the term of this patent is extended or adjusted under 35 U.S.C. 154(b) by 82 days.

(21) Appl. No.: 16/326,103

(22) PCT Filed: Aug. 15, 2017

(86) PCT No.: PCT/AU2017/050868
§ 371 (c)(1),
(2) Date: Feb. 15, 2019

(87) PCT Pub. No.: WO2018/032049
PCT Pub. Date: Feb. 22, 2018

(65) Prior Publication Data
US 2019/0193763 A1 Jun. 27, 2019

(30) Foreign Application Priority Data
Aug. 15, 2016 (AU) .................................. 2016903224

(51) Int. Cl.
*B61L 25/06* (2006.01)
*B61L 5/10* (2006.01)
(Continued)

(52) U.S. Cl.
CPC ................. *B61L 25/06* (2013.01); *B61L 5/02* (2013.01); *B61L 5/10* (2013.01); *G01L 5/0038* (2013.01); *G01L 5/22* (2013.01)

(58) Field of Classification Search
CPC .. B61L 5/02; B61L 5/10; B61L 5/0038; B61L 25/06; G01L 5/22
See application file for complete search history.

(56) References Cited

FOREIGN PATENT DOCUMENTS

| DE | 202015100566 | 5/2016 |
| GB | 205739 | 10/1923 |
| JP | 2013-224514 | 10/2013 |

OTHER PUBLICATIONS

Machine translation of DE202015100566 (Year: 2016).*
(Continued)

*Primary Examiner* — Walter L Lindsay, Jr.
*Assistant Examiner* — Andrew V Do
(74) *Attorney, Agent, or Firm* — Hanley, Flight & Zimmerman, LLC

(57) ABSTRACT

The present invention provides a measuring assembly (11) for measuring a characteristic of the movement of a first rail relative to a second rail. The measuring assembly comprises a measuring gauge (15) for measuring the characteristic and a rail movement detection device (13) to which the measuring gauge is removably secured. The detection device comprises a first subassembly (19) and a second subassembly (39) wherein the first subassembly and second subassembly are slidably interconnected. The first subassembly comprises a first rail engagement portion spaced from a first end (23) of the first subassembly. The second subassembly comprises a second rail engagement portion spaced from a first end (43) of the second subassembly. The measuring gauge is secured between the first end of the first subassembly and the first end of the second subassembly. Movement of the first rail engagement portion relative to the second rail engagement portion causes the first end of the first subassembly to
(Continued)

move away from the first end of the second subassembly, the characteristic of the movement being measured by the measuring gauge.

19 Claims, 14 Drawing Sheets

(51) Int. Cl.
    *G01L 5/22*     (2006.01)
    *B61L 5/02*     (2006.01)
    *G01L 5/00*     (2006.01)

(56) References Cited

OTHER PUBLICATIONS

International Searching Authority, "International Search Report and Written Opinion" issued in connection with International Patent Application No. PCT/AU2017/050868 dated Nov. 8, 2017, 15 pages.

International Searching Authority, "International Preliminary Report on Patentability" issued in connection with International Patent Application No. PCT/AU2017/050868 dated Dec. 2018, 58 pages.

\* cited by examiner

MEASURING ASSEMBLY, DETECTION DEVICE AND METHOD OF USING SAME

TECHNICAL FIELD

The present invention generally relates to a measuring assembly and detection device for measuring movement characteristics of rail turnouts. The present invention also relates to a method of using same. In particular the invention relates to a measuring assembly and measuring device to measure the force between a switch blade and a stock rail of a railway turnout.

BACKGROUND ART

Railways provide an efficient and cost effective means of transporting a variety of goods as well as passengers. To ensure railways provide a safe and reliable means of transportation it is critical that the rail is maintained such that it operates to specification.

Railway tracks generally comprise a single track. However, trains are often required to be diverted from one track to another track. This is achieved by using a turnout which guides a train to an alternate track.

Turnouts comprise at least one switch blade which is movable in a lateral direction with respect to a stock rail. In an open position the at least one switch blade is positioned such that a passing train will remain on a first track. In a closed position the at least one switch blade is positioned such that a passing train would be diverted to a second track.

The at least one switch blade is connected to a rod such that upon movement of the rod the blade switches between the open and closed positions. In some configurations more than one switch blade is connected to the rod. The rod is caused to move by an electric motor or may be manually moved with a lever.

A leading end, or toe end of each switch blade is tapered to ensure a relatively smooth transition of the train from the stock rail to the switch blade when the train is being diverted from the stock rail. For safe operation it is critical that the toe end of the switch blade is held firmly against the stock rail. If there is a gap between the stock rail and the switch blade when the switch blade is in the closed position, a wheel of the train may engage the gap and cause the gap to increase. This could be catastrophic as the wheel will not be travelling down the intended path. This would most likely lead to a derailment of that train.

In order to hold the toe end of the switch blade firmly against the stock rail the switch blade is typically locked when it is against the stock rail (i.e. the switch blade is in the closed position). In order to return the switch blade to the open position it is first necessary to unlock it, which will allow the switch blade to be moved. However, there are some turnouts which rely on a weight or spring arrangement to hold switch blades in place when in the closed position.

When the turnout is in good working order the weight/spring arrangements hold the switch blade firmly against the stock rail. However, over time these components wear and corrode reducing the force which may be exerted on the switch blade. In order to ensure safe rail operation it is critical that the force exerted upon the switch blade rail is sufficient to retain it firmly against the stock rail. Currently, determining whether a turnout is in sound operational condition with respect to the switch blade movement is left to the technician and his/her judgement as to whether the turnout is functioning safely. An alternate way to determine whether the force acting upon the switch blades is sufficient is to use a bar to manually force the switch blade away from the stock rail. However, this method also relies on an individual's judgement and therefore provides inconsistent results which are not quantitative.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to provide a measuring assembly comprising a measuring device, and a method for measuring the force between a switch blade and a stock rail, which will at least provides a practical choice when determining safe operation of a turnout.

While the invention is herein described with particular relevance to measuring the force between a switch blade and a stock rail, the invention may also be used to measure other characteristics of the movement between two rails. For instance, the measuring device may be adapted to measure any movement between one rail relative to another. These variations are considered to fall within the scope of this invention.

Railways incorporate turnouts which comprise at least one switch blade positioned relative to a stock rail, wherein the turnout moves from an open position, wherein a passing train will continue to travel along a first track, and a closed position wherein the passing train will be diverted to a second track. For simplicity, the below paragraphs will refer to a single switch blade and a single stock rail. However, it is to be understood that a turnout may comprise more than one switch blade and/or more than one stock rail. These variations are considered to fall within the scope of this invention.

The present invention provides a measuring assembly for measuring the force between a switch blade of a turnout and a stock rail, the measuring assembly comprises:
  a measuring gauge for measuring a force;
  a detection device to which the measuring gauge is removably secured, the detection device comprises:
    a first subassembly and a second subassembly wherein the first subassembly and second subassembly are slidably interconnected;
    the first subassembly comprises a first rail engagement portion spaced from a first end of the first subassembly;
    the second subassembly comprises a second rail engagement portion spaced from a first end of the second subassembly;
    the measuring gauge being secured between the first end of the first subassembly and the first end of the second subassembly;
  whereupon a force being applied to the first rail engagement portion and/or the second rail engagement portion is measured by the measuring gauge.

The present invention provides a measuring assembly for measuring a characteristic of the movement of a first rail relative to a second rail, the measuring assembly comprises:
  a measuring gauge for measuring the characteristic;
  a rail movement detection device to which the measuring gauge is removably secured, the detection device comprises:

a first subassembly and a second subassembly wherein the first subassembly and second subassembly are slidably interconnected;

the first subassembly comprises a first rail engagement portion spaced from a first end of the first subassembly;

the second subassembly comprises a second rail engagement portion spaced from a first end of the second subassembly;

the measuring gauge being secured between the first end of the first subassembly and the first end of the second subassembly;

whereupon movement of the first rail engagement portion relative to the second rail engagement portion causes the first end of the first subassembly to move away from the first end of the second subassembly, the characteristic of the movement being measured by the measuring gauge.

The characteristic of the movement of the first rail relative to the second rail may include force or distance.

The present invention provides a detection device for measuring the force between a switch blade of a turnout and a stock rail, the detection device comprises:

a first subassembly and a second subassembly wherein the first subassembly and second subassembly are interconnected;

the first subassembly comprises a first rail engagement portion spaced from a first end of the first subassembly;

the second subassembly comprises a second rail engagement portion spaced from a first end of the second subassembly;

whereupon movement of the first rail engagement portion towards the second rail engagement portion causes the first end of the first subassembly to move away from the first end of the second subassembly.

Preferably the first subassembly and the second subassembly are slidably interconnected.

The detection device may comprise a plurality of support arms for supporting the device on top of the switch blade and stock rail.

Each rail engagement portion may comprise at least one projection which extends downwardly below the plurality of support arms. The at least one projection of each rail engagement portion may be adapted to be positioned between the switch blade and the stock rail. Preferably each of the at least one projection is generally planar. The detection device may comprise 3 or 5 or any number of projections.

Each rail engagement portion may derive support from a support plate. Preferably each rail engagement portion depends from a support plate.

Preferably the at least one projection of the first subassembly and the at least one projection of the second subassembly may be offset relative to each other such that should the support plate of the first subassembly and the support plate of the second subassembly be in abutment, each of the at least one projections lie substantially in the same plane such that they do not abut each other.

Each subassembly may comprise an end plate at the first end. Each support plate may be held in spaced relationship from its respective end plate, such that movement of the support plate translates to movement of the end plate.

Each end plate may extend upwardly. Preferably each end plate extends sufficiently upward so that a measuring gauge may be connected therebetween for measuring characteristics of the movement.

The measuring assembly may further comprise an absorption means to absorb any extreme force which may occur as the switch blade moves from the open position to the closed position. The absorption means isolates the detection device from the force caused by the rapid movement of the switch blade to the stock rail. The absorption means may be in the form of a wedge plate positioned between the switch blade and stock rail. Preferably the wedge plate is configured to be supported relative to the switch blade and/or the stock rail such that a portion of the wedge plate is positioned between the switch blade and stock rail. The wedge plate may be removable once the switch blade has been caused to move towards its closed position. To assist in removal of the wedge plate the wedge plate may comprise an elongate handle.

In an alternative embodiment, the absorption means may be in the form of a shock absorber separate to or integral with the detection device.

The present invention further provides a method of measuring the holding force of a switch blade as the switch blade moves from an open position, wherein the switch blade is spaced from a stock rail, to a closed position, wherein a toe portion of the switch blade is adjacent the stock rail, the method comprises:

inserting a wedge plate between the switch blade and stock rail a distance from a toe end of the switch blade;

causing the switch blade to move towards its closed position;

placing a detection device at a position between the toe end of the switch blade and the wedge plate;

removing the wedge plate to allow the switch blade to move further towards the closed position;

measuring characteristics of the movement as transferred through the detection device.

Measuring characteristics of the movement may include measuring the force the switch blade exerts upon the detection device. Once the force is known the technician will be able to determine whether the force is sufficient to ensure safe operation of the turnout, or whether the turnout requires maintenance/replacement.

The present invention further provides a method of measuring the holding force of a switch blade as the switch blade moves from an open position, wherein the switch blade is spaced from a stock rail, to a closed position, wherein a toe portion of the switch blade is adjacent the stock rail, the method comprises:

inserting a wedge plate between the switch blade and stock rail a distance from a toe end of the switch blade;

causing the switch blade to move towards its closed position;

placing a detection device at a position between the toe end of the switch blade and the wedge plate, wherein independently movable, downwardly projecting portions of the detection device are located between the switch blade and the stock rail;

removing the wedge plate to allow the switch blade to move further towards the closed position;

reading the force measurements recorded on a measuring gauge located on the detection device, the force being representative of the force causing the switch blade to move towards its closed position.

When measuring the holding force of the switch blade the detection device is preferably positioned as close as possible to abut the stock rail (i.e. as close as possible to being in its closed position).

The present invention further provides a measuring assembly for measuring the force between a switch blade of a turnout and a stock rail, the measuring assembly comprises:
- a measuring gauge for measuring a force;
- a detection device to which the measuring gauge is removably secured, the detection device comprises:
- a first subassembly and a second subassembly wherein the first subassembly and second subassembly are slidably interconnected;
- the first subassembly comprises a first rail engagement portion spaced from a first end of the first subassembly;
- the second subassembly comprises a second rail engagement portion spaced from a first end of the second subassembly;
- the measuring gauge being secured between the first end of the first subassembly and the first end of the second subassembly;
- whereupon a force being applied to the first rail engagement portion and/or the second rail engagement portion is measured by the measuring gauge, the force being provided by the switch blade moving towards the stock rail.

The present invention further provides a measuring assembly for measuring a characteristic of the movement of a first rail relative to a second rail, the measuring assembly comprises:
- a measuring gauge for measuring the characteristic;
- a rail movement detection device to which the measuring gauge is removably secured, the detection device comprises:
- a first subassembly and a second subassembly wherein the first subassembly and second subassembly are slidably interconnected;
- the first subassembly comprises a first rail engagement portion spaced from a first end of the first subassembly;
- the second subassembly comprises a second rail engagement portion spaced from a first end of the second subassembly;
- the measuring gauge being secured between the first end of the first subassembly and the first end of the second subassembly;
- whereupon movement of the first rail engagement portion relative to the second rail engagement portion causes the first end of the first subassembly to move away from the first end of the second subassembly, the characteristic of the movement being measured by the measuring gauge, the movement being provided by the first rail moving towards the second rail.

The present invention further provides a detection device for measuring the force between a switch blade of a turnout and a stock rail, the detection device comprises:
- a first subassembly and a second subassembly wherein the first subassembly and second subassembly are interconnected;
- the first subassembly comprises a first rail engagement portion spaced from a first end of the first subassembly;
- the second subassembly comprises a second rail engagement portion spaced from a first end of the second subassembly;
- whereupon movement of the first rail engagement portion towards the second rail engagement portion causes the first end of the first subassembly to move away from the first end of the second subassembly, the movement being provided by the switch blade moving towards the stock rail.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

According to an embodiment, the present invention is directed to a method and assembly for measuring the force between a switch blade 10 and a stock rail 12. In a first mode of operation a switch blade is caused to move from an open position, wherein a passing train would continue to travel on a first track, to a closed position wherein the passing train would be diverted to a second track. In the closed position it is critical for the safe operation of the turnout that the switch blade is held in firm abutment with the stock rail. If the force holding the switch blade is not sufficient then the switch blade may move away from its abutment with the stock rail potentially leading to a catastrophe such as a train derailment.

Referring to the figures a measuring assembly 11 according to a first embodiment allows for the measurement of the force which holds the switch blade in its closed position. Once this measurement is known the working condition of the turnout can be critically assessed and it can be determined whether the turnout is able to operate in a safe manner, or whether repair/replacement is required.

Figure 12:
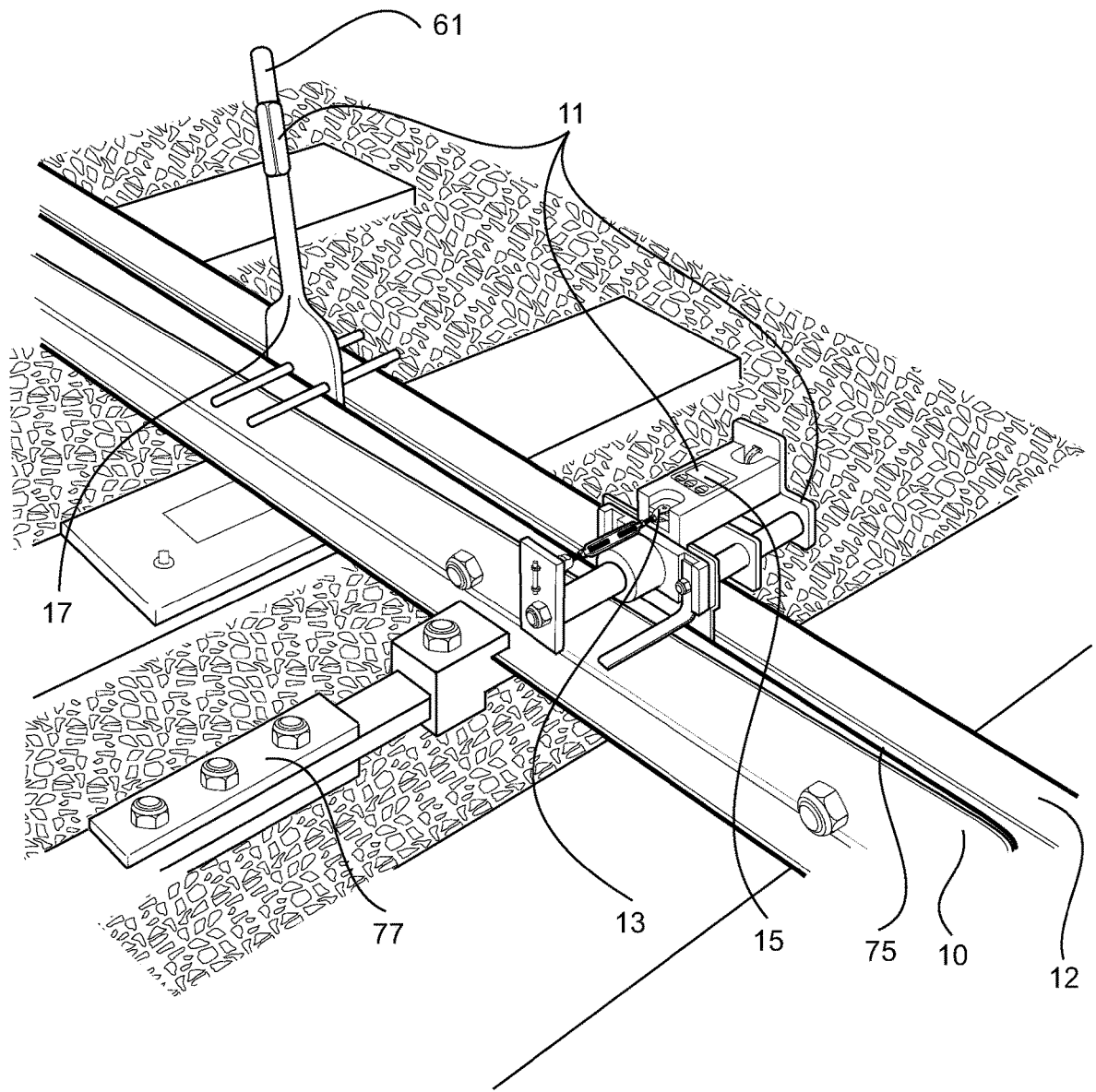
FIG. 12 is a view similar to FIG. 11 but having the measuring assembly of FIG. 1 in position.
Figure 13:
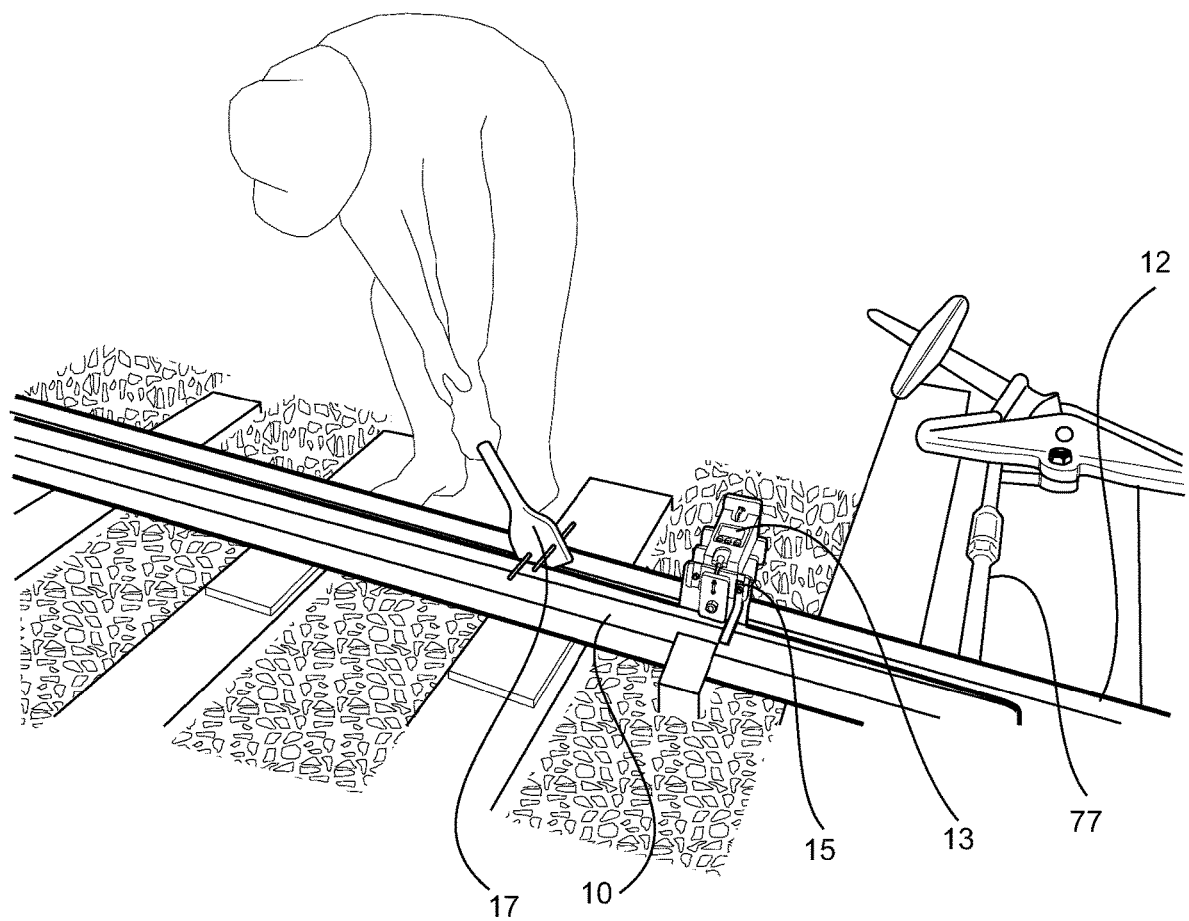
FIG. 13 is a view of the wedge plate being removed.
Figure 14:
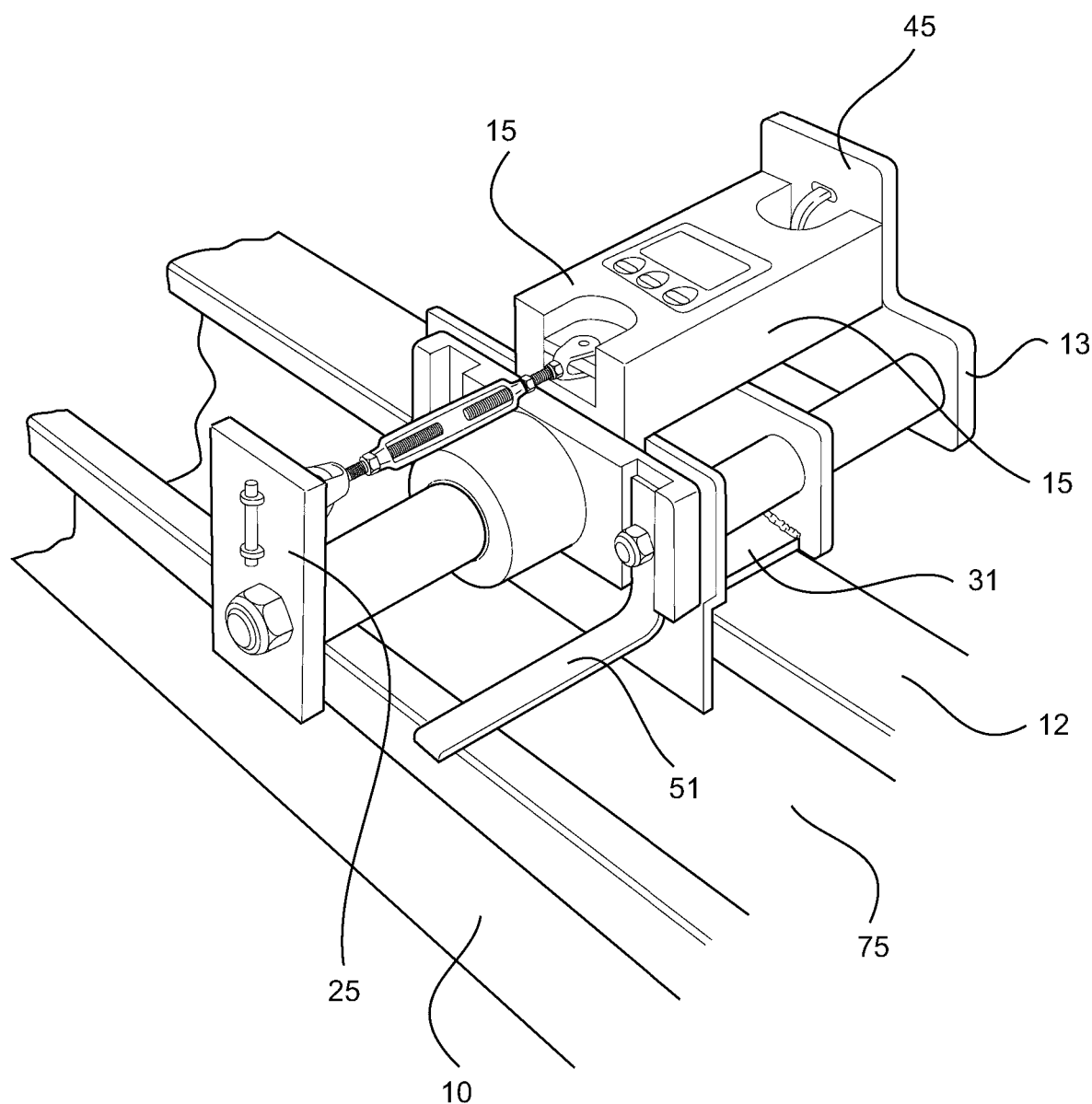
FIG. 14 is an image of the measuring assembly supported on the switch blade and stock rail, the switch blade being in the open position.

As shown in FIG. 12 the measuring assembly 11 comprises a detection device 13, a measuring gauge 15 secured thereto, and a wedge plate 17.

The detection device 13 comprises a first subassembly 19 and a second subassembly 39. The first subassembly and second subassembly are confined relative to each other such that they are slidably interconnected.

The first subassembly 19 comprises a support plate 21 which is held in a fixed spaced relationship to a first end 23 of the first subassembly 19. The first end 23 has an end plate 25. The end plate 25 and support plate 21 are interconnected by a cylindrical rod 27. The first subassembly 19 also comprises an arm plate 29 located at a second end of the first subassembly 19, such that the support plate 21 is fixed at a position between the end plate 25 and arm plate 29. The arm plate 29 comprises two support arms 31. The support arms are adapted to be placed on the rail head to support the detection device 13 when in position.

Figure 5A:
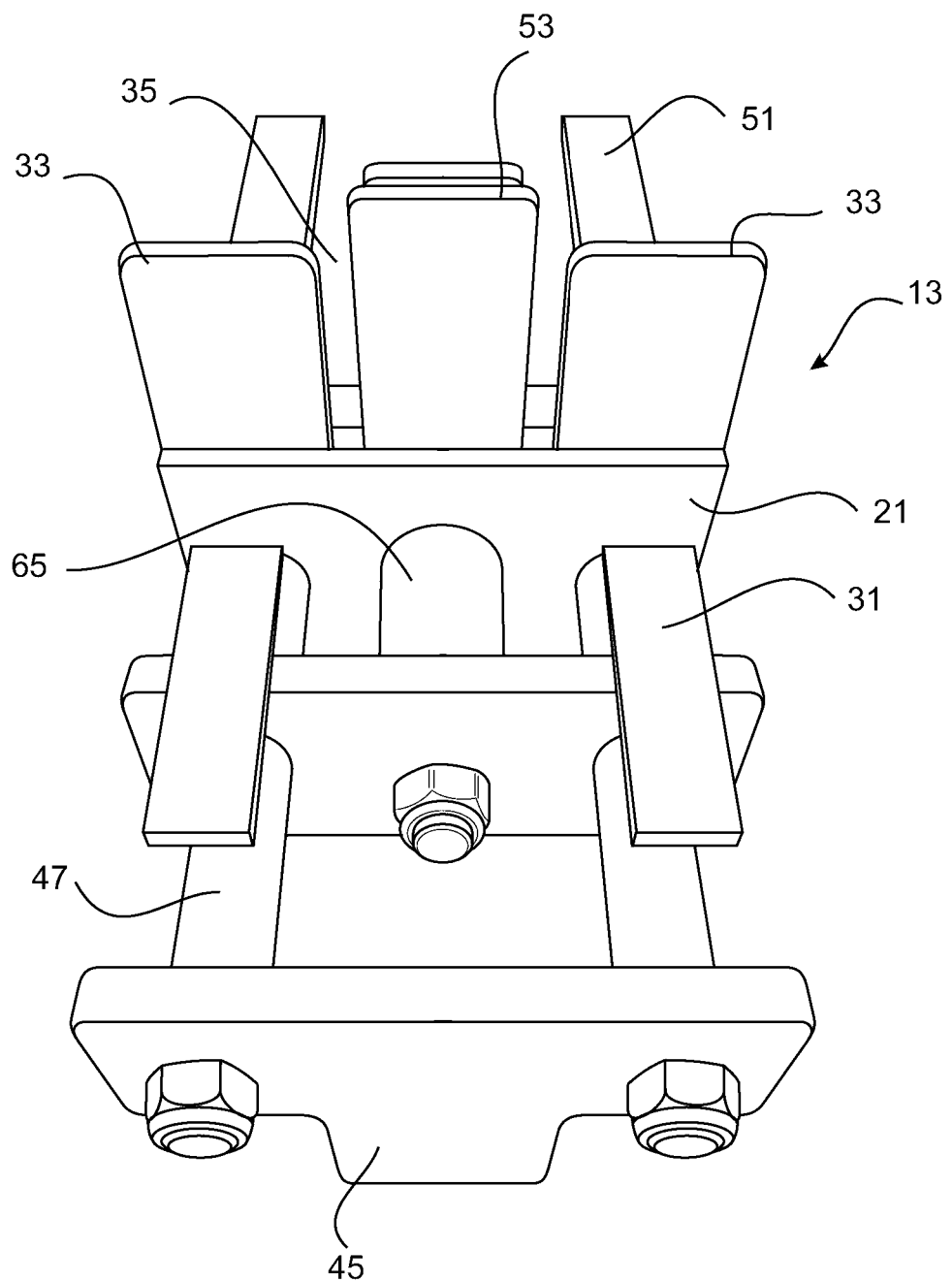
FIG. 5a is an end view image of FIG. 4 from a bottom perspective.
Figure 5B:
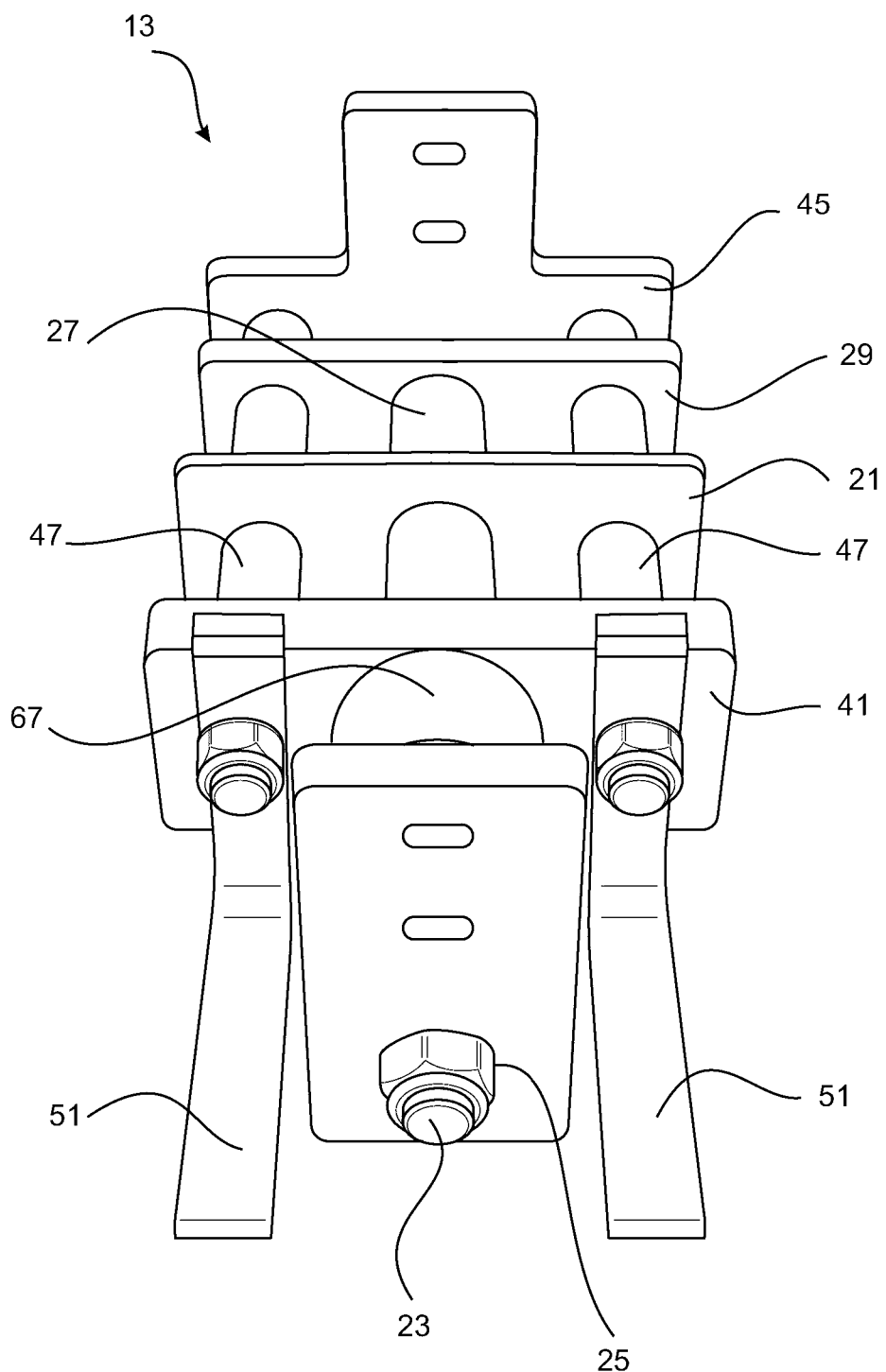
FIG. 5b is an opposite end view image of FIG. 4 from a top perspective.
Figure 6:
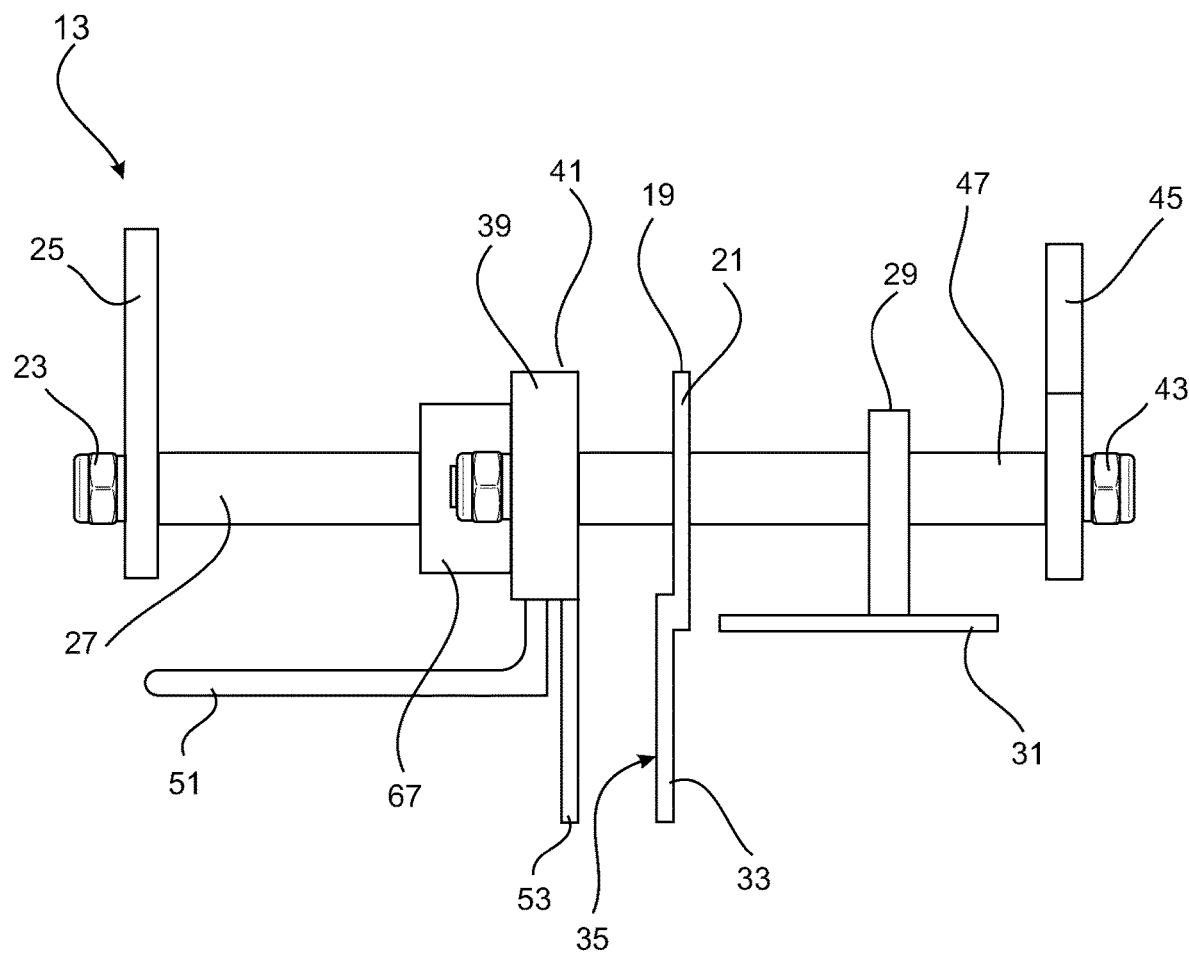
FIG. 6 is a side view image of FIG. 4.

The support plate 21 comprises a rail engagement portion in the form of two projections 33 which extend downward below the support arms 31. Each projection is planar in shape and is spaced apart along the bottom of the support plate such that a gap 35 is formed therebetween, as best shown in FIG. 5a.

The second subassembly 39 comprises a support end plate 41 which is held in a fixed spaced relationship to a first end 43 of the second subassembly 39. The first end 43 has an end plate 45. The end plate 45 and support end plate 41 are interconnected by two cylindrical rods 47.

The support end plate 41 is located at a second end of the second subassembly 39, such that the support end plate 41 is fixed at a spaced distance from the end plate 45. The support end plate 41 slidably receives the cylindrical rod 27 of the first subassembly 19

The support end plate 41 comprises two support arms 51. The support arms are adapted to be placed on the rail head to support the detection device 13 when in position.

The support arms 31, 51 of the two subassemblies 19, 39 provide support surfaces which are at different heights to each other. This accommodates differences in height of the rail head of the switch blade and the height of the rail head of the stock rail and ensures the detection device 13 is held in a substantially horizontal orientation.

The support end plate 41 comprises a rail engagement portion in the form of a projection 53 which extends downward below the support arms 51. The projection 53 is planar in shape and extends from the bottom of the support end plate 41. The width of the projection 53 is smaller than the gap 35 formed between the two projections 33 of the first subassembly 19 for reasons which will be described below.

The support plate 21 and arm plate 29 of the first subassembly 19 slidably receive the cylindrical rods 47 of the second subassembly 39.

A spacer 65 is located between the arm plate 29 and support plate 21 to hold the arm plate 29 and support plate 21 in a spaced relation.

Figure 1:
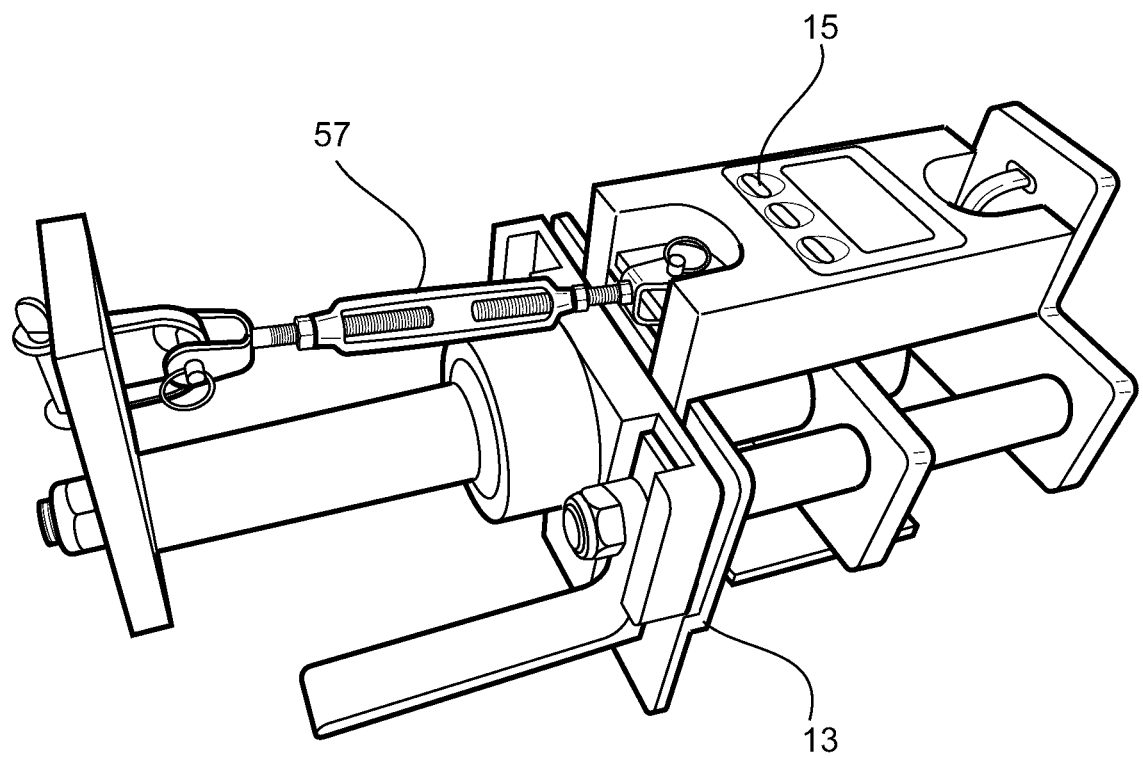
FIG. 1 is a left hand perspective image of a measuring assembly comprising a rail movement detection device and measuring gauge according to a first embodiment of the invention, the measuring assembly being adapted to measure the force between a stock rail and a switch blade.
Figure 2:
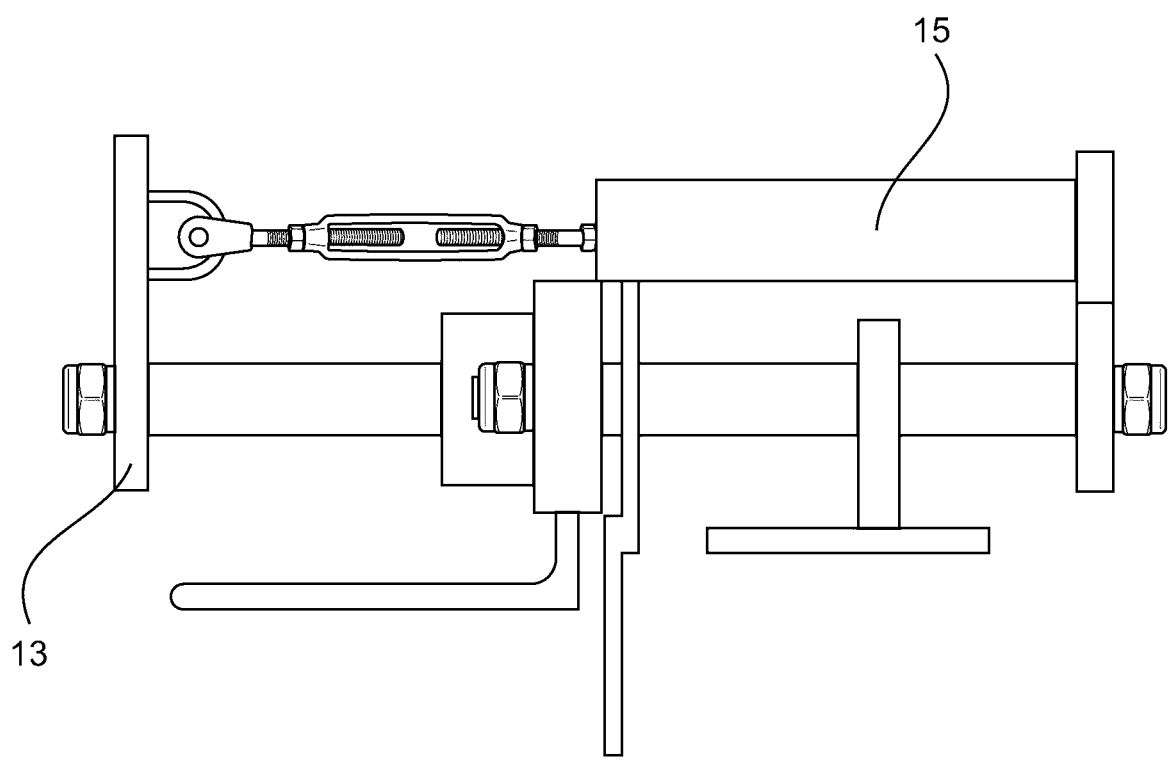
FIG. 2 is a side view image of FIG. 1.
Figure 3:
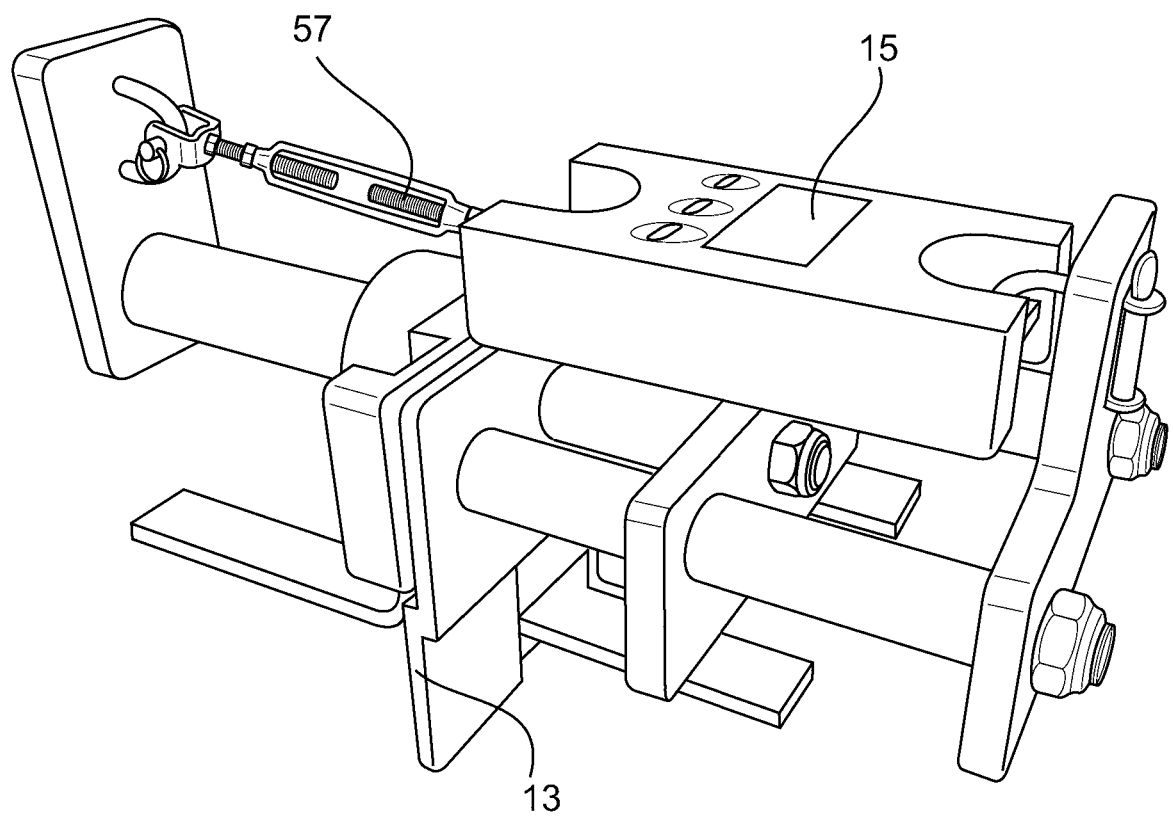
FIG. 3 is a right hand perspective view image of FIG. 1.
Figure 4:
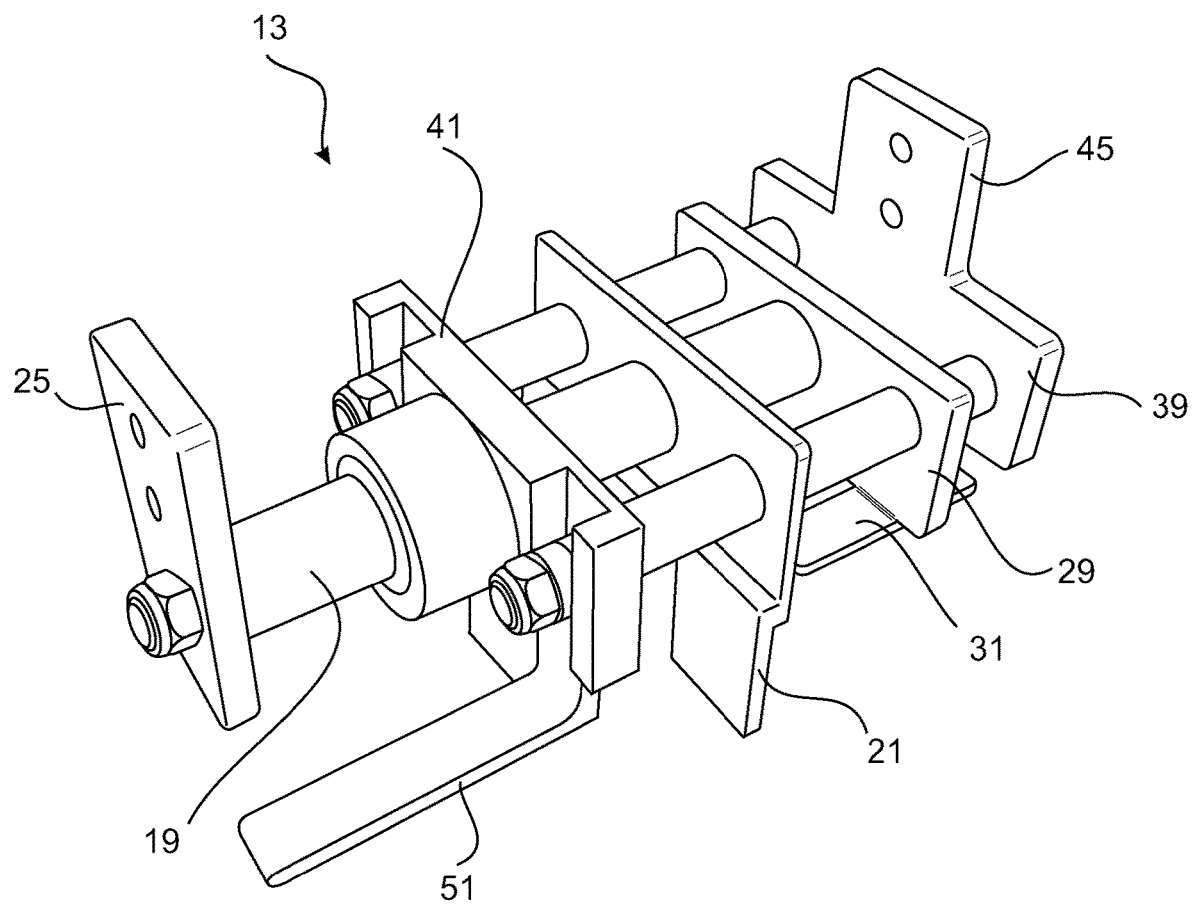
FIG. 4 is a left hand perspective view image of the rail movement detection device of FIG. 1 in an expanded position.
Figure 7:
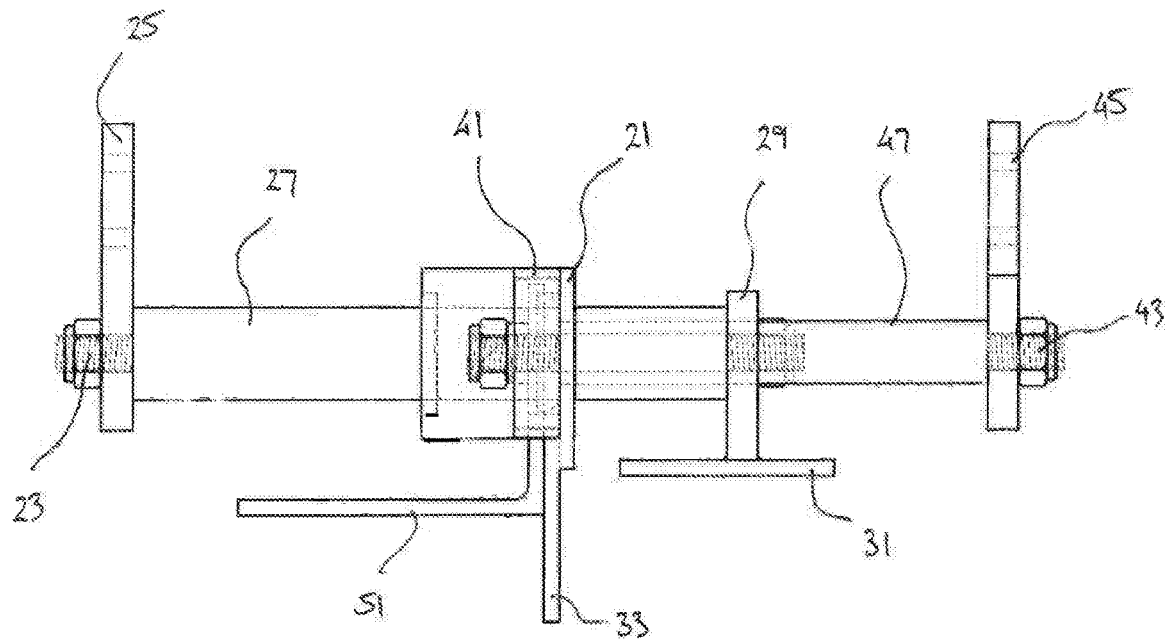
FIG. 7 is a side view drawing of the rail movement detection device shown in FIG. 1 in a contracted position.
Figure 8:
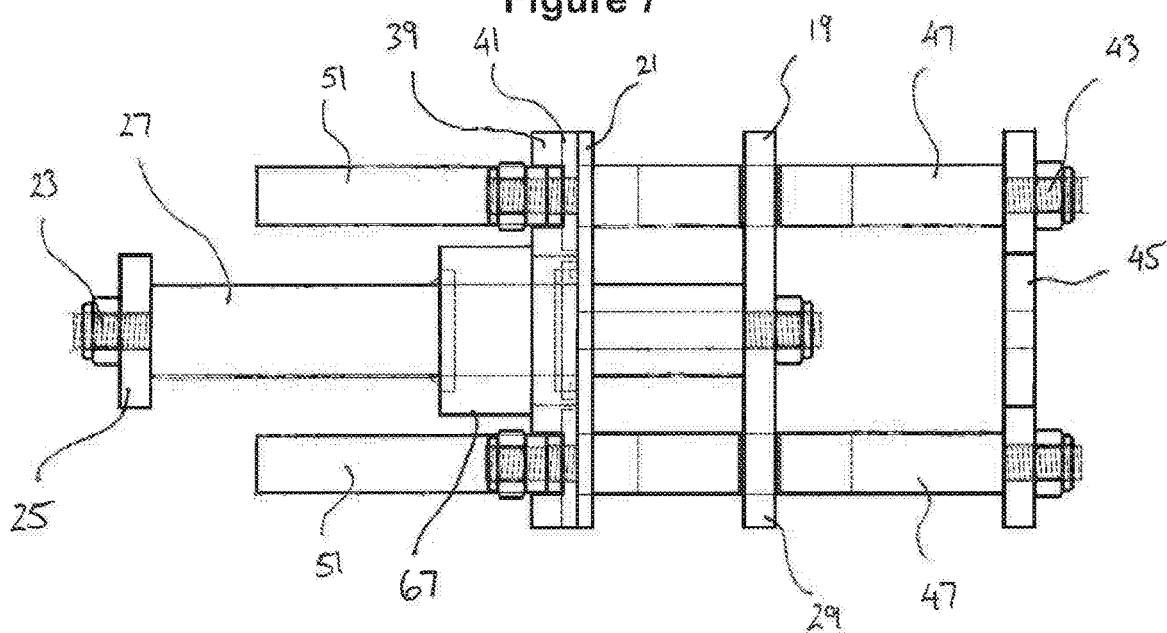
FIG. 8 is a plan view of FIG. 7.
Figure 9:
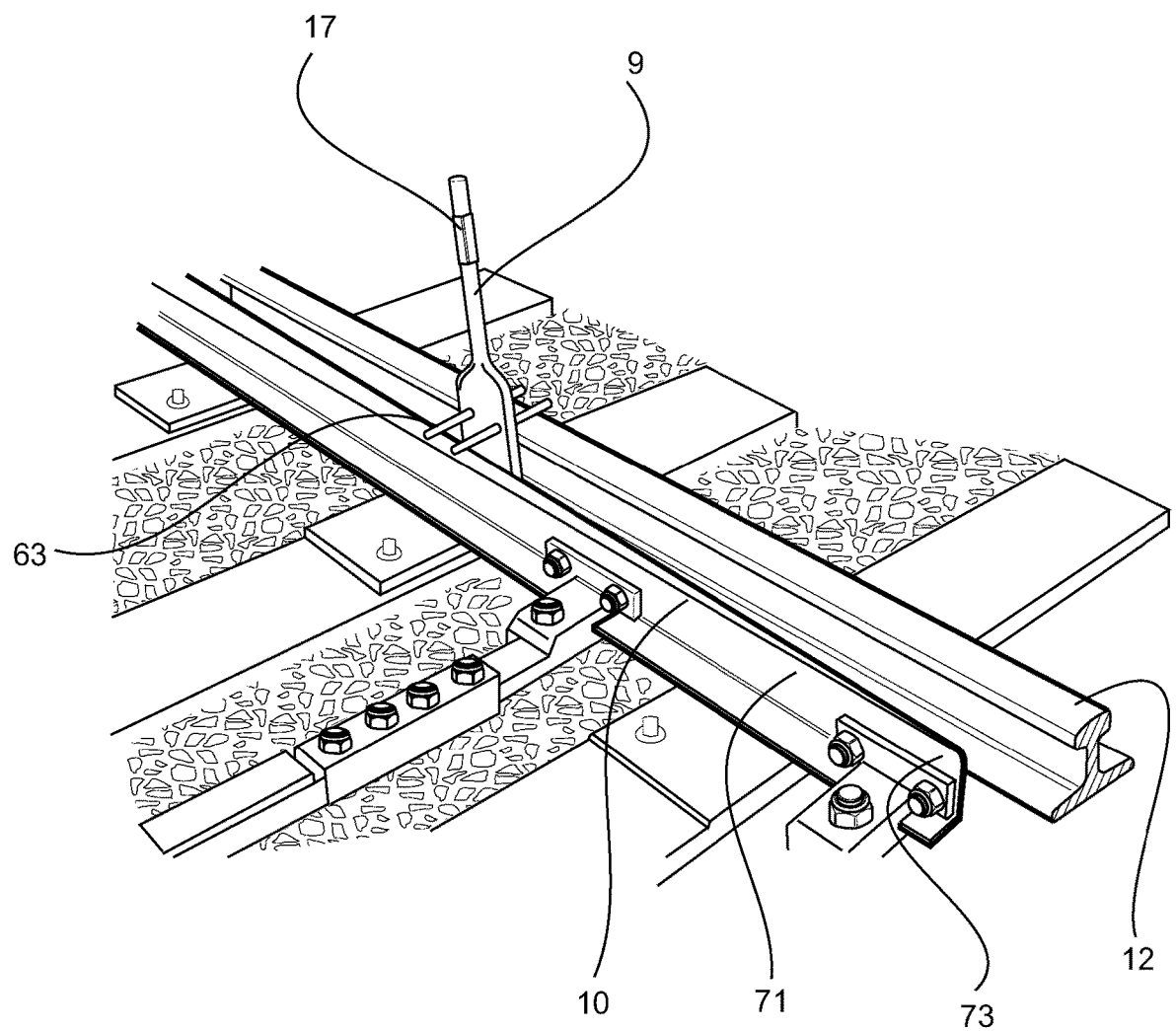
FIGS. 9 and 10 are views of a switch blade and stock rail when in an open position, and having a wedge plate positioned therebetween.
Figure 10:
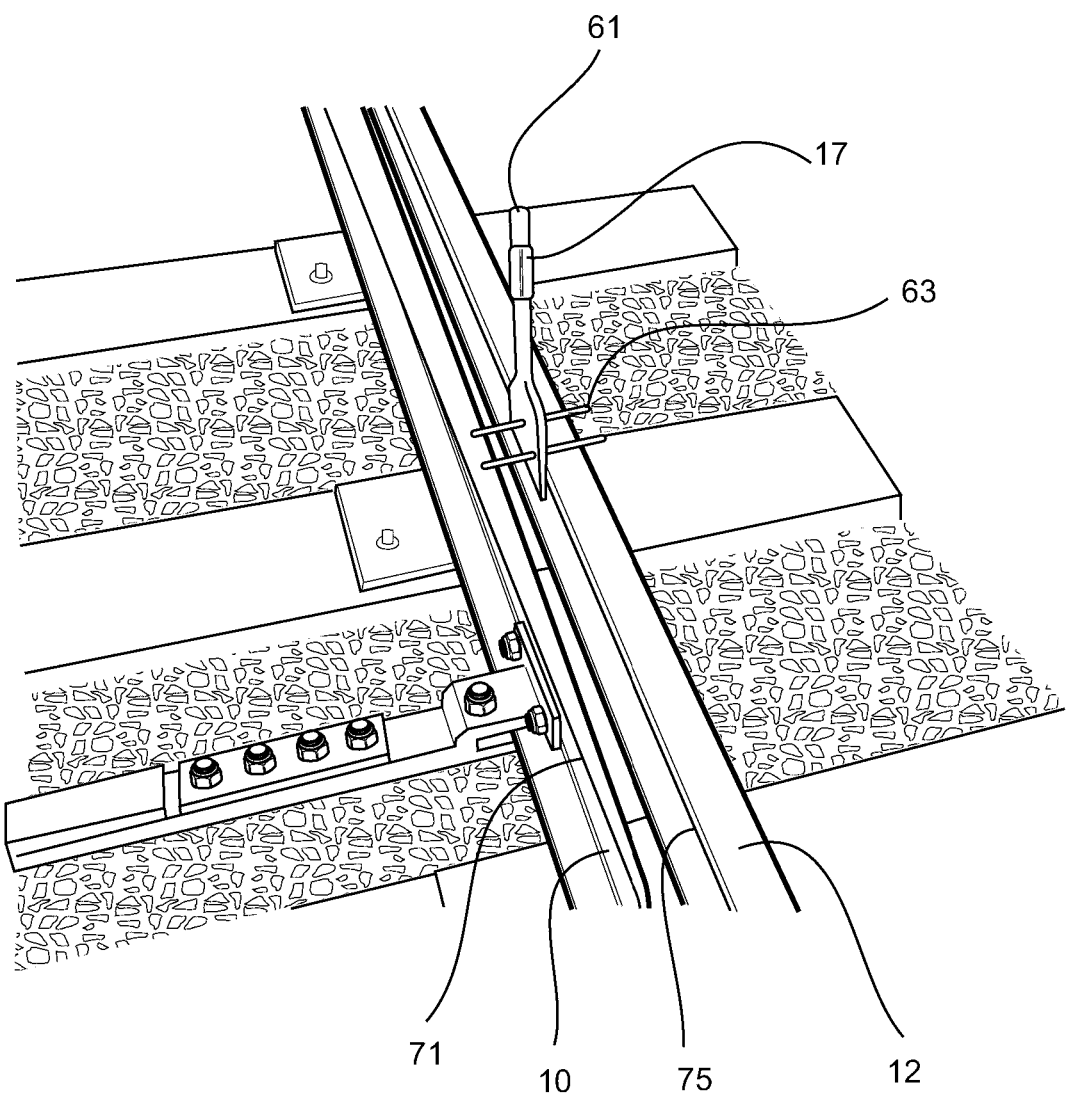

As shown in FIG. 7, the end plates 25, 45 extend upwardly, namely in a direction opposite to the extension of the projections 33, 53. The end plates 25, 45 support the measuring gauge 15 therebetween, as best shown in FIGS. 1 to 3. The measuring gauge 15 has one end connected to one end plate 25 and the other end connected to the other end plate 45. At one end an adjustment mechanism 57, such as a turnbuckle, extends between the measuring gauge 15 and the end plate to assist in setting the measuring gauge 15. The length of the adjustment mechanism may be determined by the size of the detection device and/or measuring gauge. Alternatively the detection device may be configured such that an adjustment mechanism 57 is not required.

The detection device 13 further comprises a bearing 67 to enable ease of movement between the first subassembly 19 and the second subassembly 39, yet ensure sufficient robustness of the detection device 13.

As shown in FIGS. 9 to 12, the wedge plate 17 has an elongate handle 61 extending therefrom. The wedge plate also comprises a set of pins 63 extending from either side thereof. As noted in the figures the pins 63 support the wedge plate 17 on the rails such that a portion of the wedge plate is located in the gap between the switch blade 10 and the stock rail 12.

With reference to FIGS. 9 to 13, a preferred method of measuring the force of the switch blade using the measuring assembly 11 is shown.

In use the measuring assembly 11 can accurately measure the holding force of the switch blade 10 as the switch blade 10 moves from the open position, wherein the switch blade 10 is spaced from the stock rail 12, to the closed position, wherein a toe portion 71 of the switch blade 10 is adjacent the stock rail 12.

When the switch blade 10 is caused to move to the closed position the force which is exerted through a functioning switch blade 10 can be large. It is therefore important to isolate the rail movement detection device 13 from this force. This is achieved by inserting the wedge plate 17 between the switch blade 10 and stock rail 12 when the switch blade 10 is in the open position. The wedge plate is positioned between the two rails a distance from a toe end 73 of the switch blade 10. While the preferable distance is 1 m from the toe end 73 consideration must be given as to the optimum position of the detection device 13, as discussed below.

Figure 11:
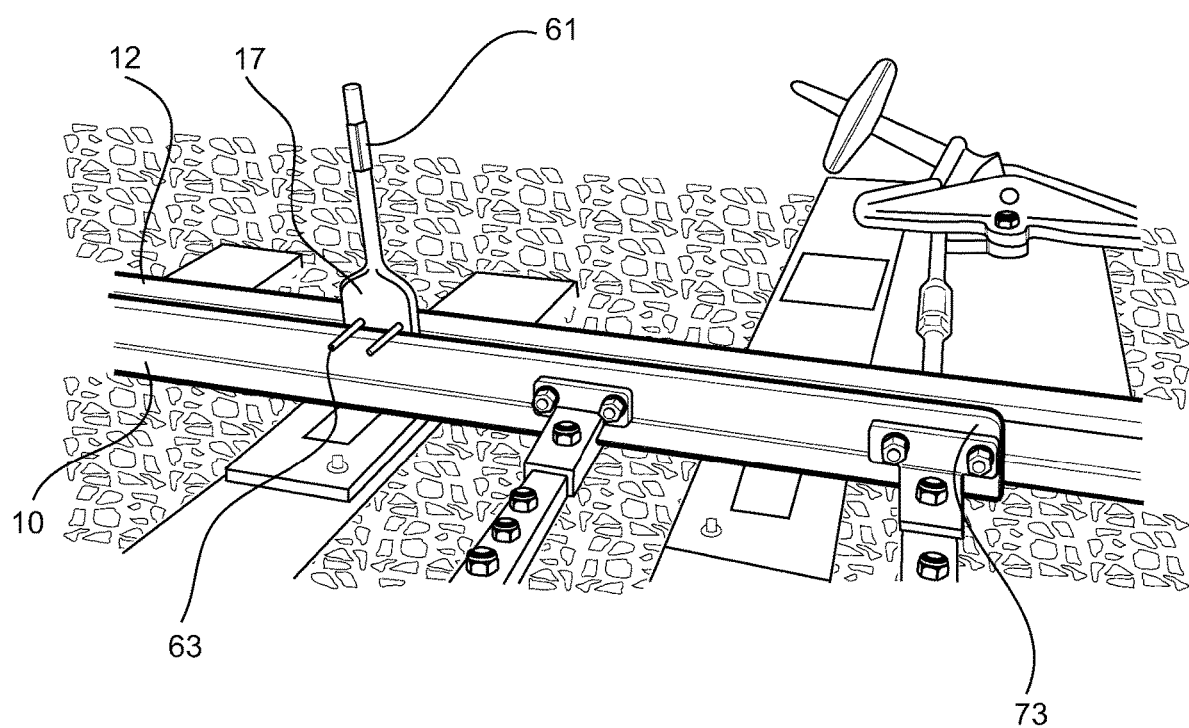
FIG. 11 is a view of a switch blade which has moved towards a closed position to be in closer proximity to the stock rail.

Once the wedge plate 17 is in position, the switch blade 10 can be caused to move towards its closed position. This will result in the wedge plate 17 being sandwiched between the switch blade 10 and stock rail 12, as best shown in FIGS. 11 and 12. Furthermore, the wedge plate 17 will prevent the switch blade 10 from abutting the stock rail 12 leaving a space 75 therebetween.

The rail movement detection device 13, with measuring gauge 15 fitted, can then be positioned on the rails such that the projections 33, 53 of the two subassemblies 19, 39 are located in the space 75 between the rails 10, 12. Before the rail movement detection device 13 is positioned in the space 75 the detection device 13 must be set. In one such example, the detection device 13 is set such that the distance between the non-facing surfaces of the two projections 33 of the first subassembly 19, and that of the projection 53 of the second subassembly 39 is 10 mm. Of course this distance can be any distance greater than the thickness of the thickest projection 33, 53. The measuring gauge can then be fitted/adjusted accordingly.

The detection device 13 is positioned between the toe end 73 of the switch blade 10 and the wedge plate 17. Ideally the detection device 13 should be positioned as close to the switch rod 77 as possible while avoiding rodding bolts, blade chairs and any other obstruction in order to preserve the detection device 13 and ensure as accurate a measurement as possible.

Once the detection device 13 is in position the wedge plate 17 can be removed. Once removed the switch blade 10 will continue to move towards the closed position. This will result in the space 75 between the rails closing, leading to the two projections 33 of the first subassembly 19, and the projection 53 of the second subassembly 39 being urged together. As the projections 33, 53 move towards each other the end plates 25, 45 are forced apart. The force which is transferred through the detection device 13 to move the end plates 25, 45 apart is measured by the measuring gauge 15.

In the present example, once the wedge plate 17 is removed the space 75 between the rails at the location the detection device 13 is positioned is reduced substantially to the distance between the non-facing surfaces of the projections 33, 53. In some applications the projections 33, 53 may move towards each other when the wedge plate 17 is removed. In other applications the space 75 between the rails is smaller than the combined thickness of the projections 33, 53. In these applications the projection 53 of the second subassembly 39 can be received in the gap 35 located between the two projections 33 of the first subassembly 19.

The process may be repeated at different positions, as well as being repeated on other switch blade(s) of the turnout.

Once the force is known and the distance between the toe end 73 to the detection device 13 is measured, a technician will be able to identify whether the force holding the switch blade in position against the stock rail (when in the closed position) is within safe working parameters for that particular turnout. Where the force is below the safe working parameters the technician is able to take immediate action to clamp the turnout in one direction and schedule the required repair/replacement.

Modifications and variations such as would be apparent to the skilled addressee are considered to fall within the scope of the present invention. For example the measurement gauge may be a smart type of gauge and may connect to a smart phone or other similar device for uploading the data thereto. By way of a further example the detection device may incorporate a handle or strap to assist in transportation and positioning of the detection device relative to the rail.

The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee. In particular positional descriptions are taken with respect to a horizontal plane or a plane in which the top surface of the set of stock rail lie.

While the invention has been shown and described with reference to certain exemplary embodiments thereof, it will be understood by those skilled in the art that various changes in form and details may be made therein without departing from the spirit and scope of the invention as defined by the appended claims.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A measuring assembly for measuring a force between a switch blade of a turnout and a stock rail, the measuring assembly comprising:
   a measuring gauge to measure the force; and
   a detection device to which the measuring gauge is removably secured, the detection device includes:
   a first subassembly and a second subassembly wherein the first subassembly and second subassembly are slidably interconnected;
   the first subassembly includes a first rail engagement portion spaced from a first end of the first subassembly;
   the second subassembly includes a second rail engagement portion spaced from a first end of the second subassembly;

the measuring gauge secured between the first end of the first subassembly and the first end of the second subassembly;

whereupon the force being applied to the first rail engagement portion and/or the second rail engagement portion is measured by the measuring gauge, the force being provided by the switch blade moving towards the stock rail.

2. A measuring assembly for measuring a characteristic of the movement of a first rail relative to a second rail, the measuring assembly comprising:
    a measuring gauge to measure the characteristic; and
    a rail movement detection device to which the measuring gauge is removably secured, the detection device includes:
    a first subassembly and a second subassembly, wherein the first subassembly and second subassembly are slidably interconnected;
    the first subassembly includes a first rail engagement portion spaced from a first end of the first subassembly;
    the second subassembly includes a second rail engagement portion spaced from a first end of the second subassembly;
    the measuring gauge secured between the first end of the first subassembly and the first end of the second subassembly;
    movement of the first rail engagement portion relative to the second rail engagement portion to cause the first end of the first subassembly to move away from the first end of the second subassembly, the characteristic of the movement being measured by the measuring gauge, the movement being provided by the first rail moving towards the second rail.

3. The measuring assembly according to claim 2 wherein the characteristic of the movement of the first rail relative to the second rail include force and/or distance.

4. A detection device for measuring a force between a switch blade of a turnout and a stock rail, the detection device comprises:
    a first subassembly and a second subassembly, the first subassembly and second subassembly are interconnected; and
    the first subassembly includes a first rail engagement portion spaced from a first end of the first subassembly;
    the second subassembly includes a second rail engagement portion spaced from a first end of the second subassembly;
    movement of the first rail engagement portion towards the second rail engagement portion to cause the first end of the first subassembly to move away from the first end of the second subassembly, the movement provided by the switch blade moving towards the stock rail.

5. The detection device according to claim 4 wherein the first subassembly and the second subassembly are slidably interconnected.

6. The detection device according to claim 4 further including a plurality of support arms to support the detection device on top of the switch blade and stock rail.

7. The detection device according to claim 6 wherein each rail engagement portion includes at least one projection which extends downwardly below the plurality of support arms.

8. The detection device according to claim 7 wherein each of the at least one projection is generally planar.

9. The detection device according to claim 7 wherein each rail engagement portion derives support from a support plate.

10. The detection device according to claim 9 wherein each of the at least one projection of the first subassembly and the at least one projection of the second subassembly are offset relative to each other such that when the support plate of the first subassembly and the support plate of the second subassembly are in abutment, each of the at least one projection lie substantially in the same plane such that they do not abut each other.

11. The detection device according to claim 4 wherein each rail engagement portion extends from a support plate.

12. The detection device according to claim 4 wherein each subassembly includes an end plate at the first end.

13. The detection device according to claim 12 wherein each support plate is held in spaced relationship from its respective end plate, such that movement of the support plate translates to movement of the end plate.

14. The detection device according to claim 12 wherein each end plate extends sufficiently upward so that a measuring gauge can be connected therebetween for measuring characteristics of the movement.

15. A measuring assembly comprising a measuring device according to claim 4, and an absorption means for absorbing a force which occurs as the switch blade moves from an open position to a closed position to isolate the detection device from the force caused by the rapid movement of the switch blade to the stock rail.

16. The measuring assembly according to claim 15 wherein the absorption means is a wedge plate positionable between the switch blade and stock rail, the wedge plate to be supported relative to the switch blade and/or the stock rail such that a portion of the wedge plate is locatable between the switch blade and stock rail.

17. The measuring assembly according to claim 15 wherein the absorption means is a shock absorber.

18. A method of measuring a holding force of a switch blade as the switch blade moves from an open position, wherein the switch blade is spaced from a stock rail, to a closed position, wherein a toe portion of the switch blade is adjacent the stock rail, the method comprising:
    inserting a wedge plate between the switch blade and stock rail a distance from a toe end of the switch blade
    causing the switch blade to move towards its closed position;
    placing a detection device at a position between the toe end of the switch blade and the wedge plate;
    removing the wedge plate to allow the switch blade to move further towards the closed position; and
    measuring characteristics of the movement as transferred through the detection device.

19. A method of measuring a holding force of a switch blade as the switch blade moves from an open position, wherein the switch blade is spaced from a stock rail, to a closed position, wherein a toe portion of the switch blade is adjacent the stock rail, the method comprising:
    inserting a wedge plate between the switch blade and stock rail a distance from a toe end of the switch blade;
    causing the switch blade to move towards the closed position;
    placing a detection device at a position between the toe end of the switch blade and the wedge plate, wherein independently movable downwardly projecting portions of the detection device are located between the switch blade and the stock rail;
    removing the wedge plate to allow the switch blade to move further towards the closed position; and
    reading the force measurements recorded on a measuring gauge located on the detection device, the force representative of the force causing the switch blade to move towards the closed position.

\* \* \* \* \*